(12) United States Patent
Beard et al.

(10) Patent No.: US 9,045,376 B2
(45) Date of Patent: Jun. 2, 2015

(54) FIBER-BASED ABLATIVE AND HIGH TEMPERATURE PRE-PREG MATERIAL

(76) Inventors: John W. Beard, Sun Lakes, AZ (US); Carl F. Varnerin, Norton, MA (US)

( * ) Notice: Subject to any disclaimer, the term of this patent is extended or adjusted under 35 U.S.C. 154(b) by 904 days.

(21) Appl. No.: 12/864,651

(22) PCT Filed: Jan. 28, 2009

(86) PCT No.: PCT/US2009/032299
§ 371 (c)(1),
(2), (4) Date: Jul. 26, 2010

(87) PCT Pub. No.: WO2009/097366
PCT Pub. Date: Aug. 6, 2009

(65) Prior Publication Data
US 2010/0307163 A1  Dec. 9, 2010

Related U.S. Application Data

(60) Provisional application No. 61/062,653, filed on Jan. 28, 2008.

(51) Int. Cl.
*B27N 3/10* (2006.01)
*C04B 35/83* (2006.01)
*C04B 35/626* (2006.01)

(52) U.S. Cl.
CPC .............. *C04B 35/83* (2013.01); *C04B 35/6269* (2013.01); *C04B 2235/602* (2013.01); *C04B 2235/658* (2013.01)

(58) Field of Classification Search
USPC ............ 264/640, 641, 642, 643, 510, 171.26, 264/172.11, 182, 206, 241, 257, 258, 1.7, 264/45.1, 139, 400, 497, 460, 461, 462, 264/463, 471, 477, 480, 482, 487, 488, 489, 264/490, 493, 494, 425, 459, 440
See application file for complete search history.

(56) References Cited

U.S. PATENT DOCUMENTS

| | | | | |
|---|---|---|---|---|
| 5,714,419 | A | * | 2/1998 | Choate .......................... 442/136 |
| 5,776,385 | A | * | 7/1998 | Gadkaree et al. ............ 264/29.5 |
| 2003/0100239 | A1 | * | 5/2003 | Gaffney et al. ............... 442/354 |
| 2004/0105970 | A1 | * | 6/2004 | Thompson et al. ......... 428/304.4 |

FOREIGN PATENT DOCUMENTS

JP          03150266       *   6/1991

* cited by examiner

*Primary Examiner* — Stella Yi
(74) *Attorney, Agent, or Firm* — Gerry A. Blodgett; David J. Blodgett; Blodgett & Blodgett, P.C.

(57) ABSTRACT

A fabric-matrix composite structure [10] for making parts [13] suitable for use in hostile, high-temperature environments, such as rocket exhaust nozzles. The structure [10] includes a fabric [11] formed of polyacrylonitrile fiber, especially a polyacrylonitrile fiber that has been oxidized, and especially a combination of polyacrylonitrile fibers that have been oxidized to different degrees. The structure [10] also includes a binder [12] that impregnates the fabric [11]. The binder [12] might be a phenolic resin. The structure is formed [30], partially cured [40], formed into a product [50], and finish cured [60].

12 Claims, 1 Drawing Sheet

FIBER-BASED ABLATIVE AND HIGH TEMPERATURE PRE-PREG MATERIAL

TECHNICAL FIELD

This invention involves composite structures especially for use in hostile high-temperature, ablative applications.

BACKGROUND ART

Structural materials and systems for forming parts for use in hostile high-temperature environments, especially for uses such as rocket exhaust nozzles, have exhibited deficient properties, in connection with the requirement for high temperature properties, high temperature endurance, low thermal expansion, high stiffness, high thermal conductivity, stiffness, improved thermal dissipation and improved dimensional stability for use in hostile, high-temperature environments.

These and other difficulties experienced with the prior art devices have been obviated in a novel manner by the present invention.

It is, therefore, an outstanding object of some embodiments of the present invention to provide a composite structure for making parts that exhibit superior high temperature properties, superior high temperature endurance, low thermal expansion, high stiffness, high thermal conductivity, stiffness, improved thermal dissipation and improved dimensional stability.

It is a further object of some embodiments of the invention to provide a composite structure that is easy and economical to produce and use.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION

A fabric-matrix composite structure for making parts suitable for use in hostile, high-temperature environments, such as rocket exhaust nozzles. The structure includes a fabric formed of polyacrylonitrile fiber, especially a polyacrylonitrile fiber that has been oxidized, and especially a combination of polyacrylonitrile fibers that have been oxidized to different degrees. The structure also includes a binder that impregnates the fabric. The binder might be a phenolic resin. The structure is formed, partially cured, formed into a product, and finish cured.

This invention is a fabric-matrix composite structure for making parts suitable for use in hostile, high-temperature environments, such as rocket exhaust nozzles. This embodiment of the composite structure of the present invention showing fabric embedded in the resin. The structure includes a fabric formed of polyacrylonitrile fiber, especially a polyacrylonitrile fiber that has been oxidized, and especially a combination of polyacrylonitrile fibers that have been oxidized to different degrees. The structure also includes a binder that impregnates the fabric. The binder might be a phenolic resin.

One embodiment of this invention is a process. Step 1 involves forming the composite structure by imbedding the fabric with the resin. Step 2 involves converting the resin and partially curing it to form a pre-preg. In Step 4, the structure is formed into a product shape, and, in Step 4, the product is finish cured.

One embodiment of this invention is a pre-preg formulation for use in ablative applications such as, but not limited to, rocket or missile exhaust nozzles and high temperature resistant, carbon/carbon applications. The pre-preg structure consists of woven fabric based on discontinuous fibers. The fibers are typically formed of a hydrocarbon material that is converted to a "pre-ox" fiber, that is, the fibers are oxidized by heating in an oxygen-containing atmosphere, until it achieves the desired level of carbon and oxygen, for example, approximately ten weight percent oxygen content. The fabric is then impregnated with a phenolic resin, and can be used in the form of broad goods, molding compound or biased tapes. The resultant pre-preg can be molded into various components.

The term "pre-preg" generally refers to a structure including polymer which is not yet completely cured or polymerized. Typically, such polymers are cured to a degree referred to as B stage. At that stage, the polymer is physically stable, but not fully cross-linked.

The field of the invention relates to a pre-preg formulation and structure with high ablative properties for the use in missile components, rocket nozzles, high temperature resistant parts and carbon/carbon high temperature resistant parts.

Various embodiments of the present invention provide an improved pre-preg formulation for ablative applications, requiring high temperature resistance, and in other carbon/carbon applications.

A "carbon/carbon" structure generally refers to a structure having at least two zones, each possessing a different carbon structure.

Some embodiments of the pre-preg system of the present invention include a fibrous material, either woven or non-woven, impregnated with a thermosetting or thermoplastic matrix resin.

Some embodiments of the present invention involve a pre-preg formulation that is thermosetting in nature and is cured/molded into rocket/missile components, high temperature components and carbon/carbon preform components at temperatures between 250 F. and 425 F. Such a pre-preg formulation might include a fibrous material that is woven, non-woven or aligned unidirectional fibers, pre-impregnated with a thermosetting phenolic matrix resin. The pre-preg formulation might include discontinuous fibers. The fabric and discontinuous fibers might consist of fibers two different fiber materials. The two fiber materials might consist of carbon fiber based on polyacrylonitrile (PAN) at a carbon content of 95+/−3% and polyacrylonitrile (PAN) based pre-ox carbon fiber at a carbon content of 60+/−5%.

The fibers might be blended into a yarn at a ratio such that the carbon content of the yarn is 82+/−10%. The yarn might be manufactured into a substrate that is impregnated with a phenolic resin. The substrate might be woven, non-woven or aligned unidirectional fibers. The phenolic resin might contains particulate fillers, short fibers, plate shaped fillers and/or nanometer-sized fillers. The pre-preg might be used as broad goods, molding compound, straight tapes or biased tapes. The pre-preg might be processed into parts via the use of compression molding, vacuum bag molding in oven, vacuum bag molding in autoclave or vacuum bag molding in hydroclave.

The pre-preg, after processing into parts via the use of compression molding, vacuum bag molding in oven, vacuum bag molding in autoclave or vacuum bag molding in hydroclave, might be converted from a phenolic impregnated fabric molded structure to a carbon impregnated fabric molded structure (also known as carbon/carbon), via exposure to a minimum of 1200 F. in a nitrogen atmosphere. The phenolic resin system is capable of being formulated with appropriate solvents for impregnation into fibrous woven fabrics, fibrous nonwoven fabrics or aligned unidirectional fibers.

The pre-preg might be molded to the required thickness for the intended application and then processed into parts via the use of compression molding, vacuum bag molding in oven, vacuum bag molding in autoclave or vacuum bag molding in hydroclave. Multiple layers of the pre-preg might be used to achieve the required thickness for the final product.

The phenolic resin used to impregnate the fibrous material can be in applied in solvated form. Solvents used for the phenolic resin can include methanol, isopropyl alcohol, denatured alcohol and acetone. The pre-preg is manufactured using the fibers/fabrics/nonwovens using conventional solvent-based or non-solvent-based techniques.

The molding of the pre-preg that is produced is conducted by conventional techniques that utilize heat, pressure, and, in some processes, vacuum. These techniques include compression molding, vacuum-bag molding in an oven, vacuum-bag molding in an autoclave, and vacuum-bag molding in a hydroclave.

The molding processes convert the pre-preg into a molded, cured (cross-linked) composite. The primary application for the pre-preg is in the use of molded components that are subsequently exposed to high temperatures. The high-temperature environment can include, but is not be limited to, ablative environments such as rocket and missile nozzles, ablative environments such as heat shields, for high temperature processing such as post-molded carbonization of the phenolic resin to form carbon/carbon structures.

BRIEF DESCRIPTION OF THE SEVERAL VIEWS OF THE DRAWING

The character of the invention, however, may best be understood by reference to one of its structural forms, as illustrated by the accompanying drawings, in which.

DETAILED DESCRIPTION OF THE INVENTION

Figure 1:
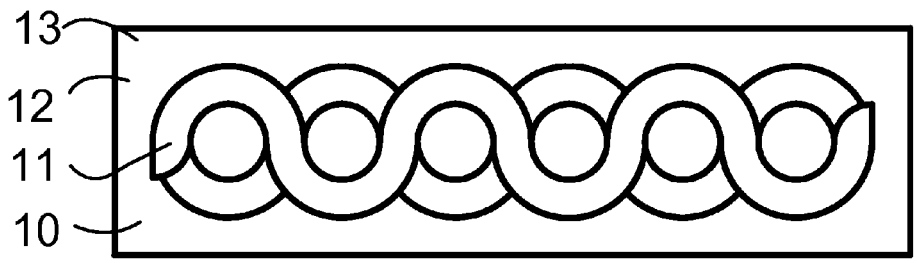
FIG. 1 is a schematic front elevation view of an embodiment of the present invention showing fabric embedded in resin, and formed into a tolerance part.

FIG. 1 is a schematic front elevation view of an embodiment of the composite structure. This invention is a fabric-matrix composite structure 10 for making parts 13 suitable for use in hostile, high-temperature environments, such as rocket exhaust nozzles. This embodiment of the composite structure 10 of the present invention showing fabric 11 embedded in the resin 12. The structure 10 includes a fabric 11 formed of polyacrylonitrile fiber, especially a polyacrylonitrile fiber that has been oxidized, and especially a combination of polyacrylonitrile fibers that have been oxidized to different degrees. The structure 10 also includes a binder 12 that impregnates the fabric 11. The binder 12 might be a phenolic resin.

Figure 2:
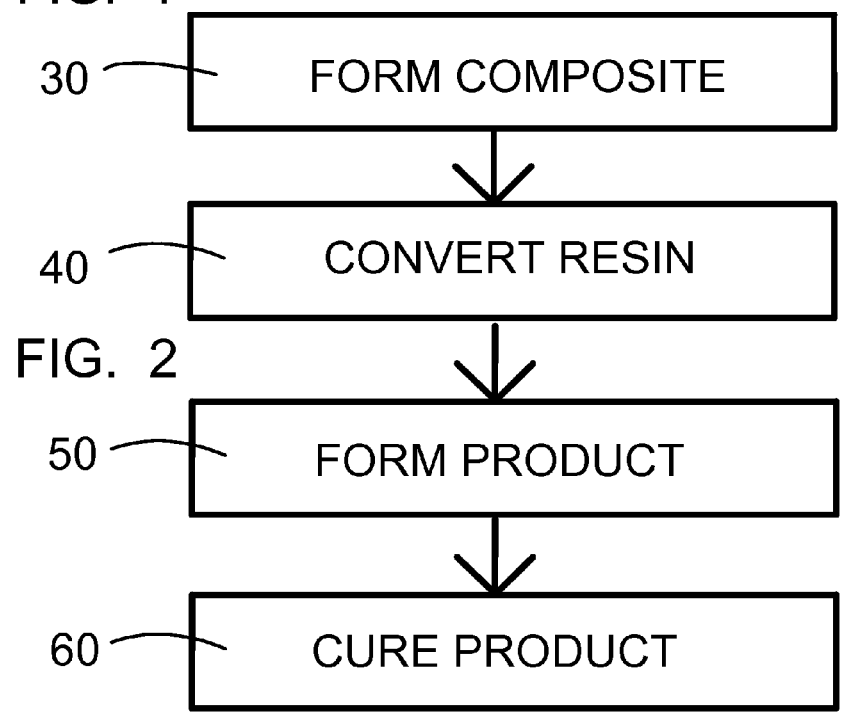
FIG. 2 is a schematic flow chart of an embodiment of this invention.

FIG. 2 is a schematic flow chart of an embodiment of this invention. Step 1 (numeral 30) involves forming the composite structure by imbedding the fabric with the resin. Step 2 (numeral 40) involves converting the resin and partially curing it to form a pre-preg. In Step 4, the structure is formed into a product shape (numeral 50), and, in Step 4, the product is finish cured (numeral 60).

One embodiment of this invention is a pre-preg formulation for use in ablative applications such as, but not limited to, rocket or missile exhaust nozzles and high temperature resistant, carbon/carbon applications. The pre-preg structure consists of woven fabric based on discontinuous fibers. The fibers are typically formed of a hydrocarbon material that is converted to a "pre-ox" fiber, that is, the fibers are oxidized by heating in an oxygen-containing atmosphere, until it achieves the desired level of carbon and oxygen, for example, approximately ten weight percent oxygen content. The fabric is then impregnated with a phenolic resin, and can be used in the form of broad goods, molding compound or biased tapes. The resultant pre-preg can be molded into various components.

The term "pre-preg" generally refers to a structure including polymer which is not yet completely cured or polymerized. Typically, such polymers are cured to a degree referred to as B stage. At that stage, the polymer is physically stable, but not fully cross-linked.

The field of the invention relates to a pre-preg formulation and structure with high ablative properties for the use in missile components, rocket nozzles, high temperature resistant parts and carbon/carbon high temperature resistant parts.

Various embodiments of the present invention provide an improved pre-preg formulation for ablative applications, requiring high temperature resistance, and in other carbon/carbon applications.

A "carbon/carbon" structure generally refers to a structure having at least two zones, each possessing a different carbon structure.

Some embodiments of the pre-preg system of the present invention include a fibrous material, either woven or nonwoven, impregnated with a thermosetting or thermoplastic matrix resin.

Some embodiments of the present invention involve a pre-preg formulation that is thermosetting in nature and is cured/molded into rocket/missile components, high temperature components and carbon/carbon preform components at temperatures between 250 F. and 425 F. Such a pre-preg formulation might include a fibrous material that is woven, nonwoven or aligned unidirectional fibers, pre-impregnated with a thermosetting phenolic matrix resin. The pre-preg formulation might include discontinuous fibers. The fabric and discontinuous fibers might consist of fibers two different fiber materials. The two fiber materials might consist of carbon fiber based on polyacrylonitrile (PAN) at a carbon content of 95+/−3% and polyacrylonitrile (PAN) based pre-ox carbon fiber at a carbon content of 60+/−5%.

The fibers might be blended into a yarn at a ratio such that the carbon content of the yarn is 82+/−10%. The yarn might be manufactured into a substrate that is impregnated with a phenolic resin. The substrate might be woven, non-woven or aligned unidirectional fibers. The phenolic resin might contains particulate fillers, short fibers, plate shaped fillers and/or nanometer-sized fillers. The pre-preg might be used as broad goods, molding compound, straight tapes or biased tapes. The pre-preg might be processed into parts via the use of compression molding, vacuum bag molding in oven, vacuum bag molding in autoclave or vacuum bag molding in hydroclave.

The pre-preg, after processing into parts via the use of compression molding, vacuum bag molding in oven, vacuum bag molding in autoclave or vacuum bag molding in hydroclave, might be converted from a phenolic impregnated fabric molded structure to a carbon impregnated fabric molded structure (also known as carbon/carbon), via exposure to a minimum of 1200 F. in a nitrogen atmosphere. The phenolic resin system is capable of being formulated with appropriate solvents for impregnation into fibrous woven fabrics, fibrous nonwoven fabrics or aligned unidirectional fibers.

The pre-preg might be molded to the required thickness for the intended application and then processed into parts via the use of compression molding, vacuum bag molding in oven, vacuum bag molding in autoclave or vacuum bag molding in hydroclave. Multiple layers of the pre-preg might be used to achieve the required thickness for the final product.

The phenolic resin used to impregnate the fibrous material can be in applied in solvated form. Solvents used for the phenolic resin can include methanol, isopropyl alcohol, denatured alcohol and acetone. The pre-preg is manufactured using the fibers/fabrics/nonwovens using conventional solvent-based or non-solvent-based techniques.

The molding of the pre-preg that is produced is conducted by conventional techniques that utilize heat, pressure, and, in some processes, vacuum. These techniques include compression molding, vacuum-bag molding in an oven, vacuum-bag molding in an autoclave, and vacuum-bag molding in a hydroclave.

The molding processes convert the pre-preg into a molded, cured (cross-linked) composite. The primary application for the pre-preg is in the use of molded components that are subsequently exposed to high temperatures. The high-temperature environment can include, but is not be limited to, ablative environments such as rocket and missile nozzles, ablative environments such as heat shields, for high temperature processing such as post-molded carbonization of the phenolic resin to form carbon/carbon structures.

While it will be apparent that the illustrated embodiments of the invention herein disclosed are calculated adequately to fulfill the object and advantages primarily stated, it is to be understood that the invention is susceptible to variation, modification, and change within the spirit and scope of the subjoined claims. It is obvious that minor changes may be made in the form and construction of the invention without departing from the material spirit thereof. It is not, however, desired to confine the invention to the exact form herein shown and described, but it is desired to include all such as properly come within the scope claimed.

What we claim as our invention is:

1. A method of forming a product for use in ablative conditions, comprising the steps of:
   a.) forming a composite structure comprised of a fabric formed of polyacrylonitrile fiber that has been oxidized and said fabric impregnated with a phenolic polymer,
   b.) partially polymerizing the polymer to B stage wherein at said B stage, the polymer is physically stable but not fully cross-linked,
   c.) forming the structure into the form of a rocket exhaust nozzle, and
   d.) carbonizing the composite structure by exposing it to sufficient heat and nitrogen atmosphere.

2. A method of forming a product for use in ablative conditions, comprising the steps of:
   a.) forming a pre-preg composite structure of a pre-preg formulation comprised of a fabric formed of polyacrylonitrile fiber that has been oxidized and said fabric impregnated with a phenolic polymer wherein the pre-preg formulation includes a fibrous material that is woven, non-woven, aligned unidirectional fibers, or discontinuous fibers wherein the fibrous material or discontinuous fibers consists of fibers of two different fiber materials consisting of carbon fiber based on polyacrylonitrile (PAN) at a carbon content of 95+/−3% and polyacrylonitrile (PAN) based pre-ox carbon fiber at a carbon content of 60+/−5%,
   b.) partially polymerizing the polymer to B stage wherein at said B stage, the polymer is physically stable but not fully cross-linked,
   c.) forming the structure into the form of the product,
   d.) carbonizing the product,
   e.) fully polymerizing the polymer, and
   f.) exposing the product to ablative conditions.

3. A method as recited in claim 2, wherein the fibrous materials or discontinuous fibers are blended into a yarn at a ratio such that the carbon content of the yarn is 82+/−10%.

4. A method as recited in claim 3, wherein the yarn is manufactured into a substrate that is impregnated with a phenolic resin.

5. A method as recited in claim 4, wherein the substrate can be woven, non-woven or aligned unidirectional fibers.

6. A method as recited in claim 2, wherein the phenolic polymer contains particulate fillers, short fibers, plate shaped fillers and/or nanometer-sized fillers.

7. A method as recited in claim 2, wherein the pre-preg composite structure can be used as broad goods, molding compound, straight tapes or biased tapes.

8. A method as recited in claim 2, wherein the pre-preg composite structure can be processed into parts via compression molding, vacuum bag molding in oven, vacuum bag molding in autoclave or vacuum bag molding in a hydroclave.

9. A method as recited in claim 8, wherein the pre-preg composite structure, after processing into parts via the use of compression molding, vacuum bag molding in oven, vacuum bag molding in autoclave or vacuum bag molding in a hydroclave, can be converted from a phenolic impregnated fabric molded structure to a carbon impregnated fabric molded structure (also known as carbon/carbon), via exposure to a minimum of 1200 F. in a nitrogen atmosphere.

10. A method as recited in claim 2, wherein the phenolic polymer is capable of being formulated with appropriate solvents for impregnation into fibrous woven fabrics, fibrous nonwoven fabrics or aligned unidirectional fibers.

11. A method as recited in claim 2, wherein the pre-preg composite structure can be molded to a desired thickness and then processed into parts via compression molding, vacuum bag molding in oven, vacuum bag molding in autoclave or vacuum bag molding in a hydroclave.

12. A method as recited in claim 11, wherein multiple layers of the pre-preg composite structure can be used to achieve the desired thickness.

* * * * *